US010434865B2

(12) United States Patent
Gorges et al.

(10) Patent No.: US 10,434,865 B2
(45) Date of Patent: Oct. 8, 2019

(54) HYBRID DRIVE MODULE FOR A MOTOR VEHICLE

(71) Applicant: VOLKSWAGEN AKTIENGESELLSCHAFT, Wolfsburg (DE)

(72) Inventors: Sebastian Gorges, Medebach-Dreislar (DE); Fabian Kolze, Barleben (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 43 days.

(21) Appl. No.: 15/574,862

(22) PCT Filed: Apr. 15, 2016

(86) PCT No.: PCT/EP2016/058352
§ 371 (c)(1),
(2) Date: Nov. 17, 2017

(87) PCT Pub. No.: WO2016/192884
PCT Pub. Date: Dec. 8, 2016

(65) Prior Publication Data
US 2018/0126837 A1 May 10, 2018

(30) Foreign Application Priority Data
May 29, 2015 (DE) .................. 10 2015 209 898

(51) Int. Cl.
*B60K 6/48* (2007.10)
*B60K 6/40* (2007.10)
(Continued)

(52) U.S. Cl.
CPC ............ *B60K 6/48* (2013.01); *B60K 6/40* (2013.01); *F16D 3/12* (2013.01); *F16D 13/52* (2013.01);
(Continued)

(58) Field of Classification Search
CPC .... B60K 6/40; B60K 6/48; B60K 2006/4825; F16D 3/12; F16D 13/00; F16D 13/52;
(Continued)

(56) References Cited

U.S. PATENT DOCUMENTS 6,258,001 B1 * 7/2001 Wakuta .................... B60K 6/26
  192/3.28
6,533,692 B1 * 3/2003 Bowen ..................... B60K 6/26
  475/5
(Continued)

FOREIGN PATENT DOCUMENTS

DE 102009059944 A1 7/2010
DE 102010015431 A1 11/2010
(Continued)

*Primary Examiner* — Leslie A Nicholson, III
(74) *Attorney, Agent, or Firm* — Laurence A. Greenberg; Werner H. Stemer; Ralph E. Locher

(57) ABSTRACT

A hybrid drive module for a motor vehicle includes at least one clutch and at least one electric machine. The clutch has an outer disk carrier and an inner disk carrier. Outer disks are disposed on the outer disk carrier and inner disks are disposed on the inner disk carrier. The outer disk carrier can be connected and/or is connected operatively to a rotor of the electric machine and a transmission input shaft. The inner disk carrier can be connected and/or is connected operatively to an internal combustion engine and a dual-mass flywheel and a centrifugal force pendulum are disposed spatially separated from one another. Torque vibrations are reduced by virtue of the fact that the centrifugal force pendulum is connected operatively to the inner disk carrier.

10 Claims, 1 Drawing Sheet

(51) Int. Cl.
*F16F 15/14* (2006.01)
*F16D 3/12* (2006.01)
*F16D 13/52* (2006.01)
*F16D 13/68* (2006.01)

(52) U.S. Cl.
CPC .......... *F16D 13/683* (2013.01); *F16F 15/145* (2013.01); *B60K 2006/4825* (2013.01); *F16D 2300/22* (2013.01); *Y02T 10/6221* (2013.01); *Y02T 10/6252* (2013.01)

(58) Field of Classification Search
CPC .. F16D 13/683; F16D 2300/22; F16F 15/145; F16F 15/14; Y02T 10/6221; Y02T 10/6252
USPC .......................................................... 475/5
See application file for complete search history.

(56) References Cited

U.S. PATENT DOCUMENTS

| | | | |
|---|---|---|---|
| 6,628,021 B2* | 9/2003 | Shinohara | B60K 6/26 310/68 B |
| 6,863,140 B2* | 3/2005 | Noreikat | B60K 6/40 180/65.23 |
| 8,161,740 B2* | 4/2012 | Krause | F16F 15/145 192/30 V |
| 8,403,120 B2 | 3/2013 | Voegtle et al. | |
| 8,585,541 B2* | 11/2013 | Mueller | B60K 6/40 180/65.22 |
| 8,617,018 B2 | 12/2013 | Wahl et al. | |
| 8,978,799 B2* | 3/2015 | Arnold | B60K 6/26 180/65.22 |
| 9,193,255 B2 | 11/2015 | Arnold et al. | |
| 2005/0279603 A1* | 12/2005 | Agner | F16D 25/0638 192/48.8 |
| 2007/0089962 A1* | 4/2007 | Enstrom | B60K 6/387 192/48.614 |
| 2008/0271968 A1* | 11/2008 | Metzinger | F16D 25/0638 192/48.8 |
| 2009/0000896 A1* | 1/2009 | Knowles | B60K 6/387 192/48.1 |
| 2012/0043176 A1* | 2/2012 | Arnold | B60K 6/40 192/48.1 |

FOREIGN PATENT DOCUMENTS

| | | |
|---|---|---|
| DE | 102010018774 A1 | 11/2010 |
| DE | 102010030690 A1 | 1/2012 |
| DE | 102012203611 A1 | 10/2012 |
| DE | 102012219028 A1 | 5/2013 |
| DE | 102013213422 A1 | 2/2014 |
| DE | 102012222533 A1 | 6/2014 |
| DE | 102014206330 A1 | 10/2014 |
| WO | 2014155169 A1 | 10/2014 |

* cited by examiner

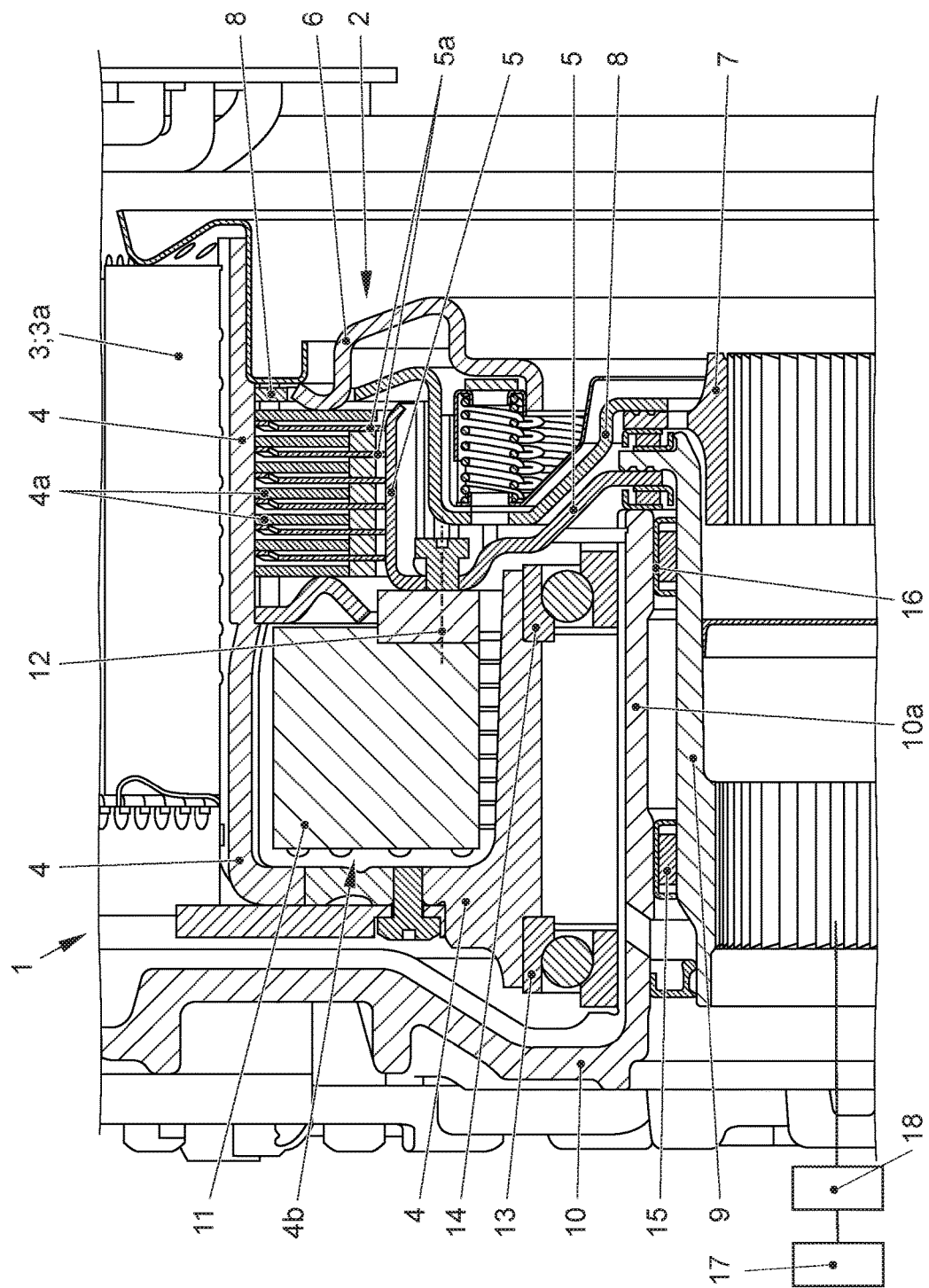

HYBRID DRIVE MODULE FOR A MOTOR VEHICLE

BACKGROUND OF THE INVENTION

Field of the Invention

The invention relates to a hybrid drive module for a motor vehicle having at least one clutch and at least one electric machine, the clutch has an outer disk carrier and an inner disk carrier, outer disks are disposed on the outer disk carrier and inner disks are disposed on the inner disk carrier, the outer disk carrier can be connected and/or is connected operatively to the rotor of the electric machine and a transmission input shaft, the inner disk carrier can be connected and/or is connected operatively to an internal combustion engine, and a dual-mass flywheel and a centrifugal force pendulum are disposed spatially separated from one another.

Hybrid drive modules of various designs for motor vehicles are known in the prior art. In general, hybrid drive modules have an internal combustion engine, an electric machine and a clutch. The clutch is used, on the one hand, for connecting the internal combustion engine operatively to the transmission of the motor vehicle, namely for coupling and decoupling the internal combustion engine to and from a transmission input shaft or, on the other hand—depending on the specific embodiment—for connecting the electric machine operatively to the transmission of the motor vehicle, namely for coupling and decoupling the electric machine to and from the transmission input shaft. A dual-mass flywheel and a centrifugal force pendulum are furthermore provided. The dual-mass flywheel and the centrifugal force pendulum are used as a "vibration absorber" for damping unwanted torsional vibrations. Embodiments of hybrid drive modules are known in the prior art, wherein the dual-mass flywheel and the centrifugal force pendulum are arranged spatially separated from one another.

In the prior art from which the invention proceeds, a hybrid drive module for a motor vehicle is known, wherein the clutch has an outer disk carrier and an inner disk carrier, and corresponding outer disks and inner disks are layered to form a disk pack between the outer disk carrier and the inner disk carrier. The rotor of the electric machine is then connected operatively to the outer disk carrier of the clutch, wherein the outer disk carrier is also connected or can also be connected operatively to a transmission input shaft. In this arrangement, the inner disk carrier can be connected operatively or is connected operatively to the internal combustion engine or combustion machine. The vibration absorber is formed by a dual-mass flywheel and a centrifugal force pendulum, which are arranged spatially separated from one another.

Thus, in the prior art, a hybrid drive module in which a dual-mass flywheel and a centrifugal force pendulum are arranged spatially separated from one another and wherein the centrifugal force pendulum is essentially connected to the outer disk carrier is known from DE 10 2014 206 330 A1.

A hybrid drive module for a dual-clutch transmission of a motor vehicle is furthermore known in the prior art from DE 10 2010 018 774 A1, wherein the dual-mass flywheel is arranged in the dry space between a drive and the dual clutch, and the centrifugal force pendulum is arranged in the wet space of the dual clutch. In this arrangement, both the dual-mass flywheel and the centrifugal force pendulum are connected operatively to the outer disk carrier of the dual clutch.

Finally, a torsion damper or vibration absorber, wherein a dual-mass flywheel and a centrifugal force pendulum are provided and the centrifugal force pendulum is coupled to the rotor of the electric machine, are known in the prior art from DE 10 2012 203 611 A1.

In the prior art from which the invention proceeds, the dual-mass flywheel and the centrifugal force pendulum are separated spatially from one another, wherein the primary side of the dual-mass flywheel is connected operatively to the engine shaft of the internal combustion engine or to the combustion machine and the secondary side thereof is connected operatively to the input shaft of the clutch. In this arrangement, the centrifugal force pendulum is connected operatively to an outer disk carrier or to the rotor carrier of the electric machine. The problem is, in particular, that the dual-mass flywheel is then coupled operatively to the centrifugal force pendulum via the clutch, namely when the clutch is closed. As a result, the clutch must then transmit higher torques and, in particular, "torsional vibrations" are correspondingly also transmitted via the clutch at the same time. Therefore, the design and effective action of the centrifugal force pendulum are problematic since, in dimensioning the centrifugal force pendulum, it is now also necessary to take account of the effect of the clutch in an appropriate manner or, in dimensioning the clutch, to take account of the influence of the centrifugal force pendulum. The "vibration absorber" which is then obtained here by means of the dual-mass flywheel, the clutch and the centrifugal force pendulum is therefore problematic to implement, or the design implementation thereof is very complex, since, in particular, it is also necessary to take account of the influence of the clutch and of the associated effects, such as micro/macro slip etc.

SUMMARY OF THE INVENTION

It is therefore the underlying object of the invention now to embody and develop the hybrid drive module of the type in question, from which the invention proceeds, in such a way that the design of a vibration absorber is simplified and, in particular, that the effects brought about by the clutch, such as micro/macro slip, are eliminated, and the dimensioning of the clutch is also simplified.

The above indicated object is now achieved in the first instance by a hybrid drive module for a motor vehicle, the hybrid drive module comprising at least one clutch and at least one electric machine, the clutch has an outer disk carrier and an inner disk carrier, outer disks are disposed on the outer disk carrier and inner disks are disposed on the inner disk carrier, the outer disk carrier can be connected and/or is connected operatively to the rotor of the electric machine and a transmission input shaft, the inner disk carrier can be connected and/or is connected operatively to an internal combustion engine, and a dual-mass flywheel and a centrifugal force pendulum are disposed spatially separated from one another. The centrifugal force pendulum is connected operatively to the inner disk carrier.

By virtue of the fact that the centrifugal force pendulum is now connected operatively to the inner disk carrier, the dual-mass flywheel and the centrifugal force pendulum are admittedly separated spatially from one another, but they can nevertheless act jointly as a "vibration absorber" on the primary side of the clutch, wherein possible effects of the clutch now no longer have any influence.

In particular, the centrifugal force pendulum is arranged directly on the inner disk carrier and/or secured directly on the inner disk carrier. The dual-mass flywheel is coupled operatively to the inner disk carrier, in particular the primary side of the dual-mass flywheel is connected to the engine shaft of the internal combustion engine, and the secondary side thereof is connected or can be connected to the input shaft of the clutch. The input shaft of the clutch is connected for conjoint rotation to the inner disk carrier, in particular by means of a welded joint.

To make possible a compact construction of the hybrid drive module, the outer disk carrier now has a specific shape, being namely, in particular, of L-shaped design or, in particular, of C-shaped design in a certain end region. The outer disk carrier then delimits, in particular at least partially, a space for the arrangement of the centrifugal force pendulum.

The outer disk carrier is connected and/or coupled operatively at its circumference to the rotor carrier of the electric machine. A particularly compact construction of the hybrid drive module is now achieved by virtue of the fact that an outer disk carrier, in particular an outer disk carrier of C-shaped design, can be supported on a shoulder or on a flange of the cooling jacket of the electric machine with the aid of bearing elements. The compact construction of the hybrid drive module is now further optimized by virtue of the fact that the input shaft of the clutch is supported on a shoulder or flange of the cooling jacket and/or the outer disk carrier is connected operatively, in particular directly, to the transmission input shaft by a driving disk.

As a result, the disadvantages mentioned at the outset are avoided and corresponding advantages are achieved, in particular through the nonpositive, material and/or positive connection of the centrifugal force pendulum to the dual-mass flywheel, since a common functional unit is thereby formed on the primary side of the clutch.

There is now a multiplicity of ways of embodying and developing the hybrid drive module according to the invention in an advantageous manner. To this end, attention may be drawn first of all to the dependent patent claims. A preferred embodiment of the invention will be explained in greater detail below with reference to the drawing and the associated description.

BRIEF DESCRIPTION OF THE SEVERAL VIEWS OF THE DRAWING

The FIGURE shows a hybrid drive module according to the invention schematically in partial section from the side.

DESCRIPTION OF THE INVENTION

The FIGURE shows, at least partially, a hybrid drive module 1 for a motor vehicle in a very highly simplified schematic illustration.

The hybrid drive module 1 has at least one clutch 2 and at least one electric machine 3. The electric machine 3 (or electric motor) has a rotor 3a and a stator (not denoted specifically and not illustrated specifically). The clutch 2 is designed as a "KO clutch" and, when closed, connects the engine shaft of the internal combustion engine operatively to a transmission input shaft 7.

The clutch 2 has an outer disk carrier 4 and an inner disk carrier 5. Outer disks 4a are arranged on the outer disk carrier 4, and inner disks 5a are arranged on the inner disk carrier 5. The outer disks 4a and the inner disks 5a together form a disk pack (not designated specifically), which can be subjected to pressure by means of an actuating piston 6.

The outer disk carrier 4 can be connected and/or is connected operatively to the rotor 3a of the electric machine 3 and to a transmission input shaft 7 or to a corresponding hub for the transmission input shaft. In particular, the rotor 3a of the electric machine 3 is connected to the outer disk carrier 4 via a rotor carrier. In the embodiment preferred here, the outer disk carrier 4 also simultaneously serves as a rotor carrier. Moreover, the outer disk carrier 4 can be connected or is connected by means of a driving disk 8 to the transmission input shaft 7 or to the hub for the transmission input shaft. A torque can therefore be transmitted from the electric machine 3, via the rotor 3a, to the outer disk carrier 4 and, from there, via the driving disk 8, to the transmission input shaft 7 or to the corresponding hub of the transmission input shaft 7. The latter option is implemented in an appropriate manner particularly for the electric drive of the motor vehicle.

The inner disk carrier 5 of the clutch 2 can be connected and/or is connected operatively to an internal combustion engine 17 or to a combustion machine. In particular, the engine shaft of the internal combustion engine is connected operatively to the inner disk carrier 5, in particular via an input shaft 9. A dual-mass flywheel (DMF) 18 is arranged between the engine shaft of the internal combustion engine and the input shaft 9 of the clutch 2, the primary side of said flywheel being connected operatively to the engine shaft and the secondary side thereof being connected operatively to the input shaft 9 of the clutch 2. When the clutch 2 is closed, a torque can therefore be transmitted from the internal combustion engine to the inner disk carrier 5, then, via the pressurized disk pack, to the outer disk carrier 4 and, from there, via the driving disk 8, to the transmission input shaft 7 or to the corresponding hub.

A dual-mass flywheel and a centrifugal force pendulum 11 are therefore provided. The dual-mass flywheel and the centrifugal force pendulum 11 are arranged spatially separated from one another, wherein the dual-mass flywheel is not shown in the FIGURE.

The disadvantages mentioned at the outset are in the first instance now avoided by virtue of the fact that the centrifugal force pendulum 11 is connected operatively to the inner disk carrier 5.

The "vibration absorber" of the hybrid arrangement or hybrid drive module 1 is now formed by the dual-mass flywheel and by the centrifugal force pendulum 11, which are connected to one another, in particular force, materially and/or form-lockingly, that is to say, in particular, are coupled to one another mechanically. In particular, the centrifugal force pendulum 11 is arranged and/or secured directly on the inner disk carrier 5, in particular by means of a screwed joint 12 indicated only schematically here. However, the centrifugal force pendulum 11 can also be welded or riveted to the inner disk carrier 5. By virtue of the fact that the dual-mass flywheel is also coupled operatively to the inner disk carrier 5, in particular via the input shaft 9, possible torsional vibrations can now be damped or compensated on one side of the clutch 2 without the need to take account of the effects of the clutch 2 itself.

The outer disk carrier 4 is now of substantially L-shaped or C-shaped design. In particular, the outer disk carrier 4 is at least partially of substantially C-shaped design, here, in the FIGURE, in the left-hand end region thereof, as shown in the preferred embodiment illustrated in the FIGURE. This has several advantages. The outer disk carrier 4 now delimits a space 4b, in which the centrifugal force pendulum 11 can be arranged. A very compact construction is thereby made possible.

As can furthermore be seen from the FIGURE, the outer disk carrier 4 is, on the one hand, connected operatively at its circumference to a rotor carrier (not designated specifically) or to the rotor 3a of the electric machine 3, and, on the other hand, is supported with the aid of two bearing elements 13 and 14 on a shoulder or on a flange 10a of the cooling jacket 10 of the electric machine 3. The input shaft 9 of the clutch 2 is supported on a shoulder or flange 10a of the cooling jacket 10, in particular by means of further bearing elements 15 and 16.

The FIGURE shows a very compact construction of a hybrid drive module 1 having a "vibration absorber" formed from a dual-mass flywheel (not illustrated explicitly here) and the centrifugal force pendulum 11, wherein the dual-mass flywheel and the centrifugal force pendulum 11 are arranged spatially separated from one another but, by virtue of the force, material and/or form-locking connection thereof, now form a "common unit" for the reduction/damping of torsional vibrations on the primary side of the clutch 2, thereby achieving the advantages stated at the outset.

LIST OF REFERENCE SIGNS 1 hybrid drive module
2 clutch
3 electric machine
3a rotor
4 outer disk carrier
4a outer disks
4b space
5 inner disk carrier
5a inner disks
6 actuating piston
7 transmission input shaft
8 driving disk
9 input shaft of the clutch
10 cooling jacket
10a flange
11 centrifugal force pendulum
12 screwed joint
13 bearing element
14 bearing element
15 bearing element
16 bearing element

The invention claimed is:

1. A hybrid drive module for a motor vehicle, the hybrid drive module comprising:
   at least one electric machine having a rotor;
   a transmission input shaft;
   at least one clutch having an outer disk carrier, an inner disk carrier, outer disks disposed on said outer disk carrier and inner disks disposed on said inner disk carrier;
   said outer disk carrier being at least one of operatively connected or configured to be operatively connected to said rotor and to said transmission input shaft;
   said inner disk carrier being at least one of operatively connected or configured to be operatively connected to an internal combustion engine; and
   a dual-mass flywheel and a centrifugal force pendulum being spatially separated from one another, said centrifugal force pendulum being operatively connected to said inner disk carrier.

2. The hybrid drive module according to claim 1, wherein said centrifugal force pendulum is at least one of disposed or secured directly on said inner disk carrier.

3. The hybrid drive module according to claim 1, wherein said dual-mass flywheel is operatively coupled to said inner disk carrier.

4. The hybrid drive module according to claim 1, wherein said outer disk carrier is substantially L-shaped or C-shaped.

5. The hybrid drive module according to claim 1, wherein said outer disk carrier is a rotor carrier having a periphery being at least one of operatively connected or coupled to said rotor of said electric machine.

6. The hybrid drive module according to claim 1, which further comprises:
   at least one bearing element;
   said electric machine having a cooling jacket with a flange; and
   said outer disk carrier being at least partially substantially C-shaped and being supported on said flange by said at least one bearing element.

7. The hybrid drive module according to claim 1, wherein said electric machine has a cooling jacket with a flange, and said clutch has an input shaft supported on said flange.

8. The hybrid drive module according to claim 1, wherein said outer disk carrier at least partially delimits a space for receiving said centrifugal force pendulum.

9. The hybrid drive module according to claim 1, which further comprises a driving disk operatively connecting said outer disk carrier to said transmission input shaft.

10. The hybrid drive module according to claim 1, wherein said centrifugal force pendulum is at least one of force-lockingly connected, materially connected or form-lockingly connected to said dual-mass flywheel.

* * * * *